(12) United States Patent
Mahadik et al.

(10) Patent No.: US 11,487,579 B2
(45) Date of Patent: Nov. 1, 2022

(54) SYSTEM AND METHOD FOR RESOURCE SCALING FOR EFFICIENT RESOURCE MANAGEMENT

(71) Applicant: ADOBE INC., San Jose, CA (US)

(72) Inventors: Kanak Vivek Mahadik, San Jose, CA (US); Ryan A. Rossi, Santa Clara, CA (US); Sana Malik Lee, Cupertino, CA (US); Georgios Theocharous, San Jose, CA (US); Handong Zhao, San Jose, CA (US); Gang Wu, San Jose, CA (US); Youngsuk Park, Stanford, CA (US)

(73) Assignee: ADOBE INC., San Jose, CA (US)

( * ) Notice: Subject to any disclaimer, the term of this patent is extended or adjusted under 35 U.S.C. 154(b) by 185 days.

(21) Appl. No.: 16/867,104

(22) Filed: May 5, 2020

(65) Prior Publication Data

US 2021/0357255 A1   Nov. 18, 2021

(51) Int. Cl.
*G06F 9/50*        (2006.01)
*G06F 11/30*       (2006.01)
*G06F 17/10*       (2006.01)
*G06F 11/34*       (2006.01)

(52) U.S. Cl.
CPC ............ *G06F 9/50* (2013.01); *G06F 11/3006* (2013.01); *G06F 11/3476* (2013.01); *G06F 17/10* (2013.01)

(58) Field of Classification Search
CPC .... G06F 9/50; G06F 11/3006; G06F 11/3476; G06F 17/10
See application file for complete search history.

(56) References Cited

U.S. PATENT DOCUMENTS

2020/0226144 A1*   7/2020   Chen .................... G06F 16/27

* cited by examiner

*Primary Examiner* — Sisley N Kim
(74) *Attorney, Agent, or Firm* — Shook, Hardy & Bacon LLP

(57) ABSTRACT

A system and method for automatically adjusting computing resources provisioned for a computer service or application by applying historical resource usage data to a predictive model to generate predictive resource usage. The predictive resource usage is then simulated for various service configurations, determining scaling requirements and resource wastage for each configuration. A cost value is generated based on the scaling requirement and resource wastage, with the cost value for each service configuration used to automatically select a configuration to apply to the service. Alternatively, the method for automatically adjusting computer resources provisioned for a service may include receiving resource usage data of the service, applying it to a linear quadratic regulator (LQR) to find an optimal stationary policy (treating the resource usage data as states and resource-provisioning variables as actions), and providing instructions for configuring the service based on the optimal stationary policy.

20 Claims, 6 Drawing Sheets

SYSTEM AND METHOD FOR RESOURCE SCALING FOR EFFICIENT RESOURCE MANAGEMENT

BACKGROUND

Various computing platforms utilize cloud storage and other resource-sharing techniques. For instance, using a combination of microservices and containers, software engineers can rapidly develop and deploy software applications using shared computing resources. In addition, third-party independent service vendors (ISVs) can deploy analysis and visualization services on such platforms.

For example, applications may be built as micro-services deployed within containers. A container image is a lightweight, standalone, executable package of software that includes everything needed to run an application: code, run-time, system tools and libraries. In contrast to traditional monolithic application design, in a container approach an application is broken down into multiple, functionally unique tasks that are simultaneously developed by different software engineering teams. Computing resources need to be provisioned for each of these tasks or services individually. These services undergo striking variations in load, so performance of these services depends on the provisioned computer resources. Fewer resources can result in performance degradation and costly service-level agreement (SLA) violations; while more resources lead to poor resource utilization and wasted money for providers of these platforms. So while statically provisioning resources for peak demand potentially reduces the risk of performance degradation during high loads, it leads to unnecessary over-provisioning and waste of substantial resource costs and energy expenditure.

To automatically adapt resources to changes in load, conventional cluster managers such as the KUBERNETES and MESOS resource management systems, and other public clouds typically utilize an autoscaler. Autoscalers use heuristics and rules to scale a service up or down based on thresholds. For example, some autoscalers add or remove resources by a specified multiplicative factor when an application hits predefined thresholds of usage. Unfortunately, it is not obvious how an autoscaler needs to be configured and how many resources need to be added or removed to efficiently meet performance demands. Such rule-based autoscaling strategies depend on a software engineer to correctly specify conditions to adjust capacity. The software engineer needs to factor in several criterion such as input load on the service, heterogeneity of resources, scaling performance, response time guarantees, and overheads associated with scaling among many others. In addition, she needs to use sophisticated performance analysis tools and to invest significant time to understand the performance of the service. Moreover, individual performance analysis on each service does not scale because of the sheer volume of services. Hence, autoscaler configurations and resources are often incorrectly configured, leading to low resource utilization. In addition, such reactive approaches can lead to poor quality of service if the change in resource demands is quicker than the reconfiguration time.

As an alternative to manual heuristics and static thresholds at which to adjust resource usage to scale up or down, predictive approaches may be used. These predictive approaches can anticipate increase in resource requirements based on past resource usage of the services and perform fast reconfiguration. However, conventional predictive approaches, such as linear regression and ANN-based methods, are only known to capture simple workload behavior and are not scalable. Some predictive approaches also require huge amounts of samples to learn and thus often lack stability and interpretability.

SUMMARY

Embodiments of the present invention relate to, among other things, automatically adjusting computing resources provisioned for a service. In accordance with one aspect, a resource management system utilizes predictive resource scaling for efficient resource management. The resource management system receives historical resource usage data of the service and generates predictive resource usage for the service over a time interval by applying the historical resource usage data to a predictive model (such as a predictive time-series based model). Scaling behavior is simulated using the predictive resource usage. Specifically, for each of a plurality of service configurations, scaling requirements (e.g., a number of times the service would need to scale up or down provisioned resources) that satisfy the predictive resource usage are determined. Furthermore, resource wastage is determined based on the predictive resource usage and the scaling requirements for each of the plurality of service configurations. A cost value is generated for each of the plurality of service configurations based on the scaling requirements and the resource wastage. The service is configured with one or more of the plurality of configurations automatically selected based on the cost value for each of the plurality of configurations.

In accordance with another aspect, a resource management system employs reinforcement learning for resource allocation for a service. The resource management service receives resource usage data of the service and applies the resource usage data to a linear quadratic regulator (LQR) to find an optimal stationary policy, wherein the resource usage data is treated as states and at least one of the following are treated as actions: (1) a threshold at which to scale up or scale down the computing resources provisioned for the service, and (2) an amount or percentage by which to scale up or scale down the computing resources provisioned for the service. Instructions are provided for configuring the service automatically based on the optimal stationary policy.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
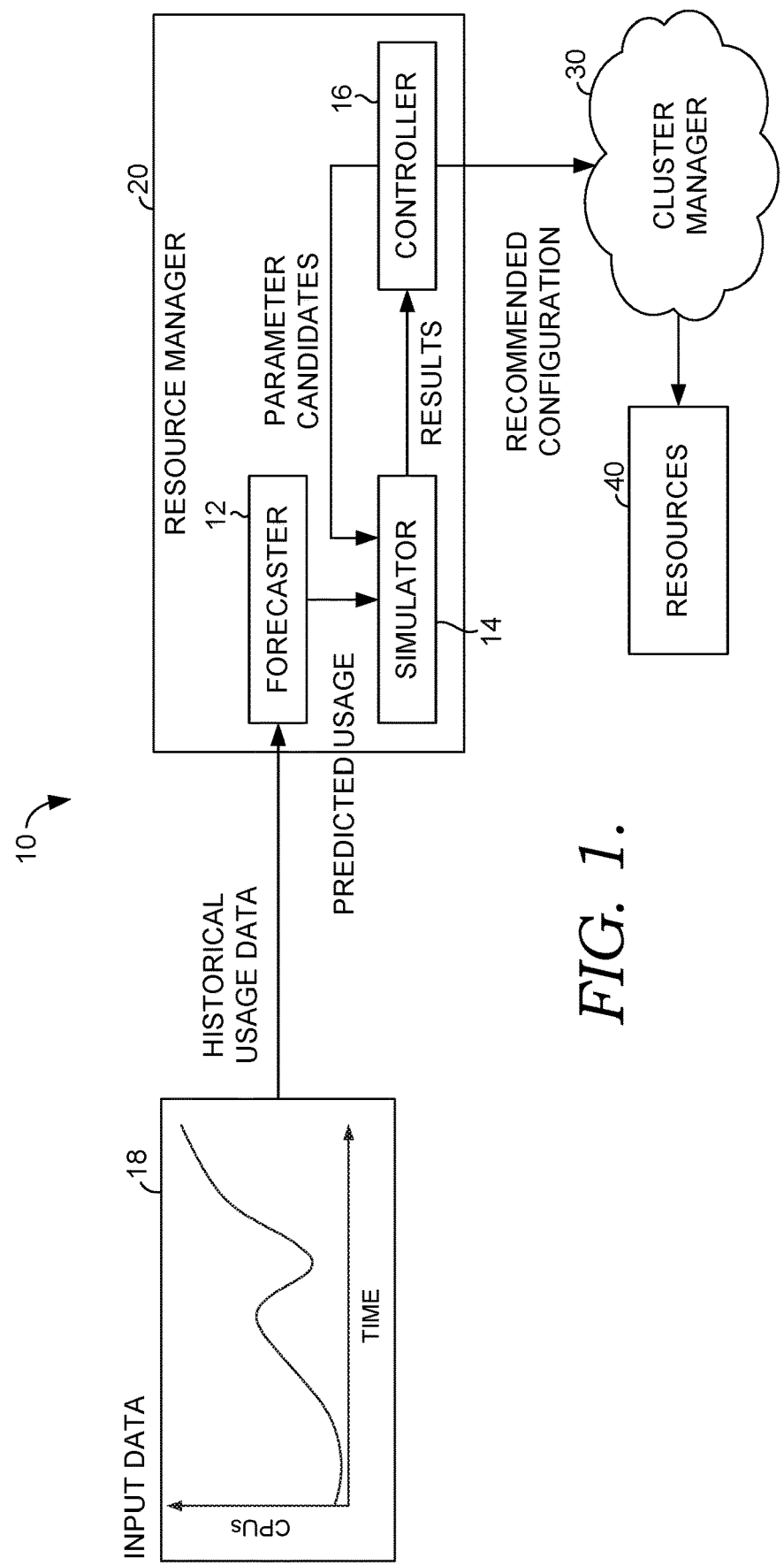
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Embodiments of the present invention relate to automatically adjusting computing resources provisioned for a service. In conventional resource management systems, cluster mangers or other resource managers use an auto-scaling policy to scale a service up and down by a specified scaling factor if the service hits the high watermark and/or the low watermark. If not enough resources are provisioned for the service, poor quality of service can result, while if more resources than required are provisioned for the service, this can lead to low resource utilization and waste. In addition, poor quality of service can result if the change in resource demands is quicker than the reconfiguration time. Specifically, there are several types of delays associated with scaling events to prevent unwarranted scaling. These include scale-out delay, scale-in delay, and cool down delay. Scale-out delay and scale-in delay are used to prevent bursty metric data triggering unwarranted scaling, while cool-down delay avoids scale-up followed by scale-down oscillations. These delays impact the running service and can lead to performance degradation and SLA violations.

Embodiments of the present invention are directed to approaches for automatically adjusting computing resources that provide improvements over conventional resource management systems. A first aspect of the technology described herein is directed to automatically adjusting computing resources provisioned for a service using predictive resource scaling. Specifically, this approach uses workload patterns of services in cloud environments and minimizes the estimation error in predicting future service usage while maintaining optimal system utilization and execution overheads. In accordance with this aspect of the technology described herein, historical resource usage data of the service is received and predictive resource usage for the service over a time interval is generated by applying the historical resource usage data to a predictive model, such as a time series based model. Scaling behavior is simulated using the predictive resource usage. Specifically, for each of a plurality of service configurations, scaling requirements (e.g., a number of times the service would need to scale up or down provisioned resources) that satisfy the predictive resource usage are determined. Furthermore, resource wastage is determined based on the predictive resource usage and the scaling requirements for each of the plurality of service configurations. A cost value is generated for each of the service configurations based on the scaling requirements and the resource wastage. The service is configured with one or more of the service configurations automatically selected based on the cost value for each of the plurality of configurations. For example, the service may be configured by sending the automatically selected service configuration(s) to a cluster manager, which can scale the resources provisioned for the service up and/or down in accordance with the automatically selected configuration(s).

Accordingly, the first aspect of the technology described herein advantageously provides a novel closed-loop system which automatically provisions computer resources for containerized services based on 1) predicting time-varying resource requirements of services and 2) optimizing for both resource efficiency (e.g., operating costs) and scaling overheads (e.g., user experience). By dynamically adapting to future resource usage of a service, the technology described herein increases service performance and reliability.

A second aspect of the technology described herein is directed to a resource management system that employs reinforcement learning (RL) for resource allocation for a service. The resource management service receives resource usage data of the service and applies the resource usage data to a linear quadratic regulator (LQR) to find an optimal stationary policy. Specifically, the resource usage data is treated as states and at least one of the following are treated as actions: (1) a threshold at which to scale up or scale down the computing resources provisioned for the service, and (2) an amount or percentage by which to scale up or scale down the computing resources provisioned for the service. Instructions are provided for configuring the service automatically based on the optimal stationary policy. For example, the instructions can indicate what scale up or scale down thresholds should be used for the service and/or by how much the resources should be scaled up or scaled down. Advantageously, varying workloads and variations in demand/traffic can be flexibly and effectively managed in real-time without any manual tuning. Specifically, this RL system can self-adapt dynamically during runtime (e.g., scale-up/down). This contrasts with existing heuristic-based methods that are costly in terms of time and monetary cost as they require domain experts to hand-tune parameters and are static and unable to change in response to traffic or other workload factors that are inherently dynamic.

Predictive Resource Scaling

With reference now to the drawings, FIG. 1 is a block diagram illustrating an exemplary system 10 for carrying out predictive resource scaling in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the system 10 includes a resource manager 20, cluster manager 30, and resources 40. The system 10 can be implemented using one or more computers, one or more server devices, one or more platforms with corresponding application programming interfaces, cloud infrastructure, and the like. The resource manager 20 automatically selects configurations such as thresholds described herein and provides those configurations to the cluster manager 30. The cluster manager 30 configures the resources 40 using configurations, such as scaling up or scaling down resources provisioned to a service. The service or any services described herein may include computer instructions, applications, or software that performs automated tasks. Services may run inside a system that provides utilities such as containerization, clusterization, continuous integration and deployment, custom auto-scaling, and orchestration to rapidly go from development to production. This may include using technologies such as DOCKER, KUBERNETES, COREOS, DC/OS (MESOS), or any other similar resource management systems for providing these utilities.

The resources 40 are any computer resources used to run the services or applications described herein, including any combination of the following: memory disks, central processing units (CPUs), servers, containers, memory, disks, computing devices, and any other computer data storage or computer processing resources known in the art. Container orchestrators such as KUBERNETES handle resource management and placement for the services and may expect service owners to specify resource requirements and other placement constraints for the service. The specification of service requirements or resource provisioning requirements implemented via the cluster manager 30 may take a variety of forms, such as a service specification consisting of one or more of the following: 1) CPUs: the number of CPUs required within each container, 2) memory or disk: memory or disk size required within each container, 3) minimum and maximum containers: lower and upper limits on number of containers that can run for the service, 4) high and low watermarks (e.g., for CPU utilization, what percent CPU utilization triggers a scale-up or scale-down event), and 5) scale-up and scale-down multipliers: what multiple of running containers should be added or removed by the scale-up or scale-down events. There are several ways to scale, or adjust, computer resources for the service, such as vertical scaling (i.e., the process of increasing the resources available to each virtual machine) and horizontal scaling (i.e., the process of increasing the number of virtual machines).

The resource manager 20 includes a forecaster 12, a simulator 14, and a controller 16. Furthermore, the resource manager 20 is communicably coupled with a historical usage data source 18 for providing historical usage data to the forecaster 12. The resource manager 20 is also communicably coupled with the cluster manager 30 for receiving instructions from the controller 16. These instructions include scale up and scale down thresholds (e.g., high and low watermarks) and/or information regarding an amount of scaling up or scaling down for the cluster manager 30 to execute. In some embodiments of the technology described herein, the historical usage data source 18 may receive ongoing usage data from the cluster manager 30 and/or the service to which the cluster manager 30 is provisioning resources and may store this as additional historical usage data for use by the forecaster 12.

The forecaster 12 is configured to generate predictive resource usage of a service applying a predictive model to historical usage data from the historical usage data source 18. In some embodiments, the predictive model used is a time series based model such as an autoregressive integrated moving average (ARIMA) model that employs the Hyndman-Khandakar algorithm to implement a fitting process. However, other machine-learning models can be used without departing from the scope of the technology described herein. In some embodiments, the predictive model is a predictive time series based model that generates predictive resource usage for one time interval in advance, and the time interval used is adjustable based on specifications of the services.

Historical usage data may be fed to the forecaster 12 and the forecaster 12 may fit the predictive model onto the historical usage data. For example, the forecaster 12 may be configured to employ the Hyndman-Khandakar algorithm to implement the fitting process. However, other fitting techniques may be used without departing from the scope of this technology.

Seasonal variations may be considered by the forecaster 12, such as a 6-hour seasonality, a 24-hour seasonality, a seven day seasonality, or even no seasonality. In some embodiments, the forecaster 12 is configured to estimate the predictive resource usage one time interval in advance, with the time interval based on the selected seasonality. However, the time interval may be adjusted based on the specific service, as determined using trial and error or other. The forecaster 12 may be configured to predict predictive resource usage with low error using the predictive model and historical service usage data.

The simulator 14 is configured to simulate the behavior of scaling infrastructure using the predictive resource usage data from the forecaster 12. Specifically, the simulator 14 may use the predictive resource usage from the forecaster 12 to determine scaling requirements (e.g., a number of times the service would need to scale up or down) and a total resource wastage for a specified configuration during a given interval of time. The scale up and the scale down of the services can include increasing and decreasing a quantity of CPUs, containers, network I/O, and/or memory or disk size of each container. The scaling requirements for a given interval of time may be based on a configuration tuple and the predictive resource usage which is then used to determine the resulting resource wastage using the simulator 14. For example, the simulator 14 may aggregate the amount of resource wastage for various scale up and scale down periods of time throughout the simulated time interval using a cost function and then store an overall cost associated with a configuration tuple. Such stored overall costs associated with the configuration tuple may be output as a cost-value list and returned to the controller 16.

A configuration tuple is a data structure that has a specific number and sequence of elements. For example, in some embodiments, a configuration tuple used by the systems and methods herein can include the following: {CPUs, minimum-containers, maximum-containers, low-watermark, high-watermark, scale-out-factor, scale-in-factor}. As noted above, CPUs identified within this tuple can include the number of CPUs required within each container or can alternatively be replaced with or supplemented with data regarding memory or disk size required within each container. Minimum and maximum containers can refer to lower and upper limits on number of containers that can run for the service. The high and low watermarks can include thresholds for when provisioned resources should be scaled up and when they should be scaled down respectively. For example, for CPU utilization, the high and low watermarks may refer to what percent CPU utilization triggers a scale-up or scale-down event. Scale out factors and scale in factors can refer to scale-up and scale-down multipliers, such as what multiple of running containers should be added or removed by the scale-up or scale-down events.

The cost function may be configured to reduce both the resource wastage and the number of scalings made by the cluster manager 30 on behalf of the service during a given time interval. Specifically, the cost function may be used by the controller 16 to compare different sets of resource configurations for their utility in terms of utilization and overheads. The cost function may have two terms, namely resource wastage (to estimate utilization) and scaling requirements such as the number of times the service would undergo scale out based on its predictive resource usage and configuration. In the context of CPU usage, the resource wastage is the difference between total allocated CPUs and total used CPUs for a service. However, the methods described herein are not limited to CPU usage and may alternatively be based on other usage indicia, such as number of servers, number of containers allocated, or amount of memory or disk space allocated. Number of scalings refers to the count of scaling events associated with scaling the service up (e.g., adding containers) or down (e.g., reducing containers) when the service hits a scaling threshold. However, other scaling requirements, scaling patterns, or scaling indicators of the amount of scaling occurring for a particular configuration and predictive resource usage over a given period of time may be used without departing from the scope of the technology described herein.

Various cost functions may be used within the scope of the technology described herein. However, in one embodiment, the cost function may be a weighted sum of resource wastage and the overhead. The term "overhead" generally refers to any combination of excess or indirect computation time, memory, bandwidth, or other resources that are required to perform a specific task or service. Specifically, if $f$ is the function representing utility maximizer-overhead-minimizer, then $f(t)$, for a given data point, is obtained as:

$$f(t) = \omega_{waste} * \omega(t) + \omega_{overhead} * s(t)$$

where $$w(t) = \frac{w(t) - w_{min}}{w_{max} - w_{min}}$$

$$s(t) = \frac{s(t) - s_{min}}{s_{max} - s_{min}}$$

$$w(t) = allocated\_cpus(t) - used\_cpus(t)$$

s(t) is the number of scalings.

Resource wastage and scaling overheads have a tradeoff. For example, larger containers with a higher number of CPUs will require fewer scaling events to scale up and down, but will also waste more capacity. In one embodiment of the cost function, α=1 where both system utilization and overheads are equally important. Wastage and scaling values as shown in the equations above may be normalized to transform the data to fit the interval [0,1].

The controller 16 operates by sending a search space of configuration parameters to the simulator 14 to estimate system utilization and overheads associated with each configuration. The controller 16 employs a cost function, as discussed above, to determine a cost value for each configuration. A cost-value list is returned to the controller 16 from the simulator 14, and the controller 16 may pick (based on results of the cost function described above) the configuration tuple that minimizes waste and usage overheads as the output value to be used to configure the service. The output value is provided to the cluster manager 30, which may launch the service with the specified service specifications using the recommended configuration values. The historical usage data source 18 and/or the forecaster 12 may then start receiving workload usage values for this service, creating a closed-loop solution. In one example embodiment, values obtained using the technology described herein may have the following configuration tuple: {CPUs, minimum-containers, maximum-containers, low-watermark, high-watermark, scale-out-factor, scale-in-factor}={8, 32, 60, 0.2 (20% utility), 0.7 (70% utility), 2, 0.67}. However, other values may be used depending on the particular service without departing from the scope of the technology described herein. Furthermore, other tuple parameters may be considered using the approach herein without departing from the scope of the technology described herein.

Figure 2:
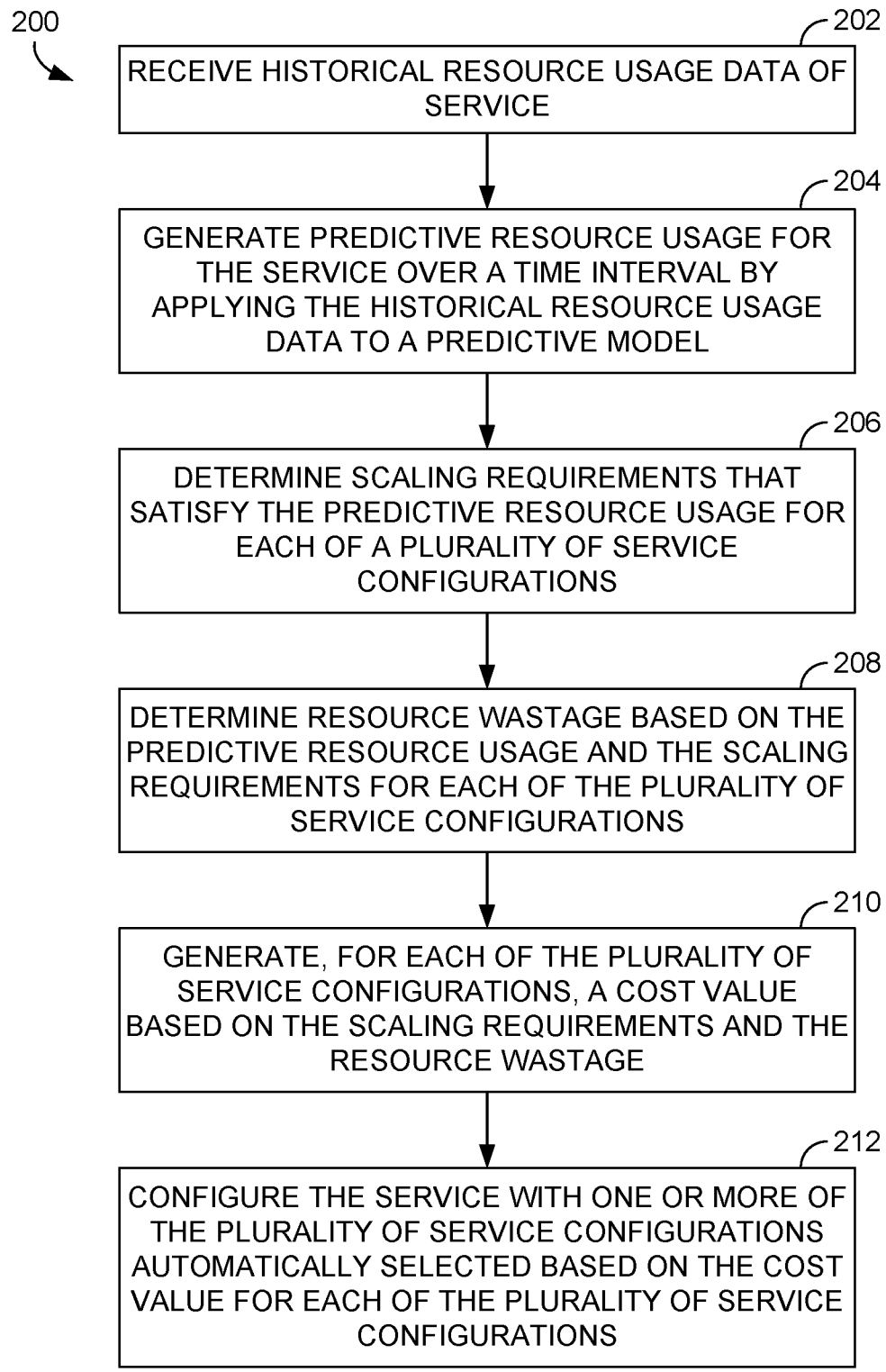
FIG. 2 is a flow diagram showing a first method for automatically adjusting computing resources provisioned for a service in accordance with some implementations of the present disclosure.

With reference now to FIG. 2, a flow diagram is provided that illustrates a method 200 for automatically adjusting computing resources provisioned for a service using predictive resource scaling. The method 200 may be performed, for instance, by the resource manager 20 of FIG. 1. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Historical resource usage data of a service is received, as depicted in block 202. Predictive resource usage, for the service over a time interval are generated by applying the historical resource usage data to a predictive model, as depicted in block 204. For each of a plurality of service configurations, scaling requirements that satisfy the predictive resource usage are determined, as depicted in block 206. Furthermore, resource wastage is determined based on the predictive resource usage and the scaling requirements for each of the plurality of service configurations, as depicted in block 208. In some embodiments, steps 206 and 208 may involve a simulation that determines a number of times the service would need to scale up or down resources provisioned and a resulting total resource wastage for the predictive resource usage over the time interval when applying each of the service configurations. For each of the plurality of service configurations, a cost value is generated based on the scaling requirements and the resource wastage, as depicted in block 210. For example, the cost value may be determined using the cost function described above herein. The service is automatically configured with one or more of the plurality of service configurations based on the cost value for each of the plurality of service configurations, as depicted in block 212. This configuring may be accomplished, for instance, by automatically selecting one or more of the service configurations based on the cost values and sending the selected service configuration(s) to the cluster manager 30 of FIG. 1, which uses the selected service configuration(s) to determine when and/or by how much to scale the resources provisioned for the service up and/or down.

Figure 3:
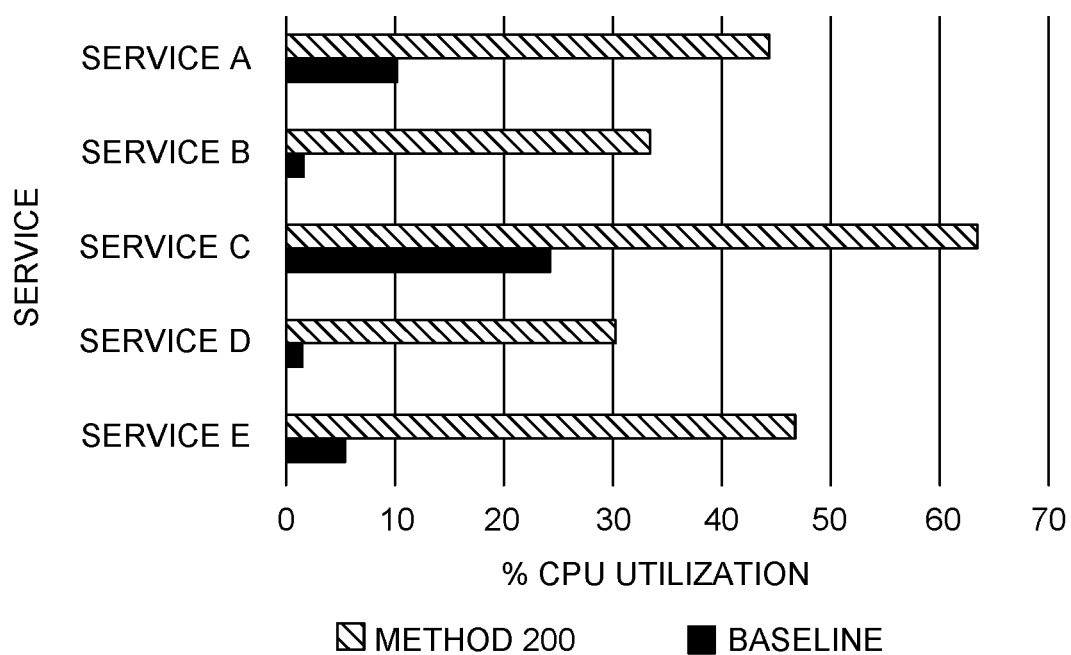
FIG. 3 is a graph depicting increased efficiency using the first method depicted in FIG. 2.

Advantageously, the technology described herein is service-agnostic and does not make strong assumptions based on the specific service or application. The technology can be used successfully with threshold-based auto-scaling rules in enterprise clusters to provide higher resource efficiency. By way of example to illustrate, FIG. 3 demonstrates results achieved using the technology described herein as compared to a baseline on five different production services. The baseline used for this comparison had service owners choose the service specification and resource allocation in an ad hoc manner without any additional guidance. CPU usage was collected for each service recorded at five-minute intervals using the technology described herein and this baseline. The data was collected for 36 days. As shown in FIG. 3, CPU usage for each service was improved using the technology described herein over the baseline. Overall, the CPU utilization average approximately 43.9 percent across the servers, compared with the baseline with an average CPU utilization across all services of about 8.7 percent.

Structured Reinforcement Learning

Figure 4:
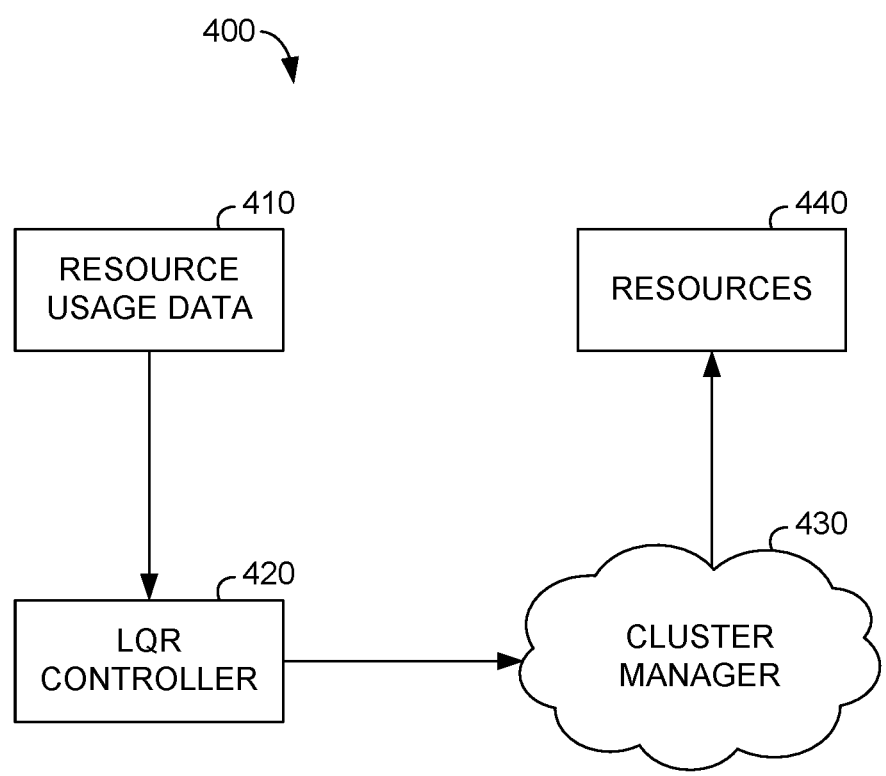
FIG. 4 is a block diagram illustrating another exemplary system in accordance with some implementations of the present disclosure.

With reference now to the drawings, FIG. 4 is a block diagram illustrating an exemplary system 400 for carrying out resource scaling using structured reinforcement learning in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 4, the system 400 includes a resource usage data source 410, an LQR controller 420 that receives input from the resource usage data source 410, a cluster manager 430 that receives input from the LQR controller 420, and resources 440 which are provisioned for the service or application via the cluster manager 430. Specifically, the resource usage data source 410 may be any source of current or historical resource usage data and may be communicably coupled to the LQR controller 420. The LQR controller 420 is configured to apply resource usage data to a linear quadratic regulator (LQR) to find an optimal stationary policy. The LQR controller 420 is also communicably coupled with the cluster manager 430 to output instructions thereto. The instructions are based on the LQR and optimal stationary policy and are used by the cluster manager 430 to configure the service or the resources 440 provisioned to the service.

Figure 5:
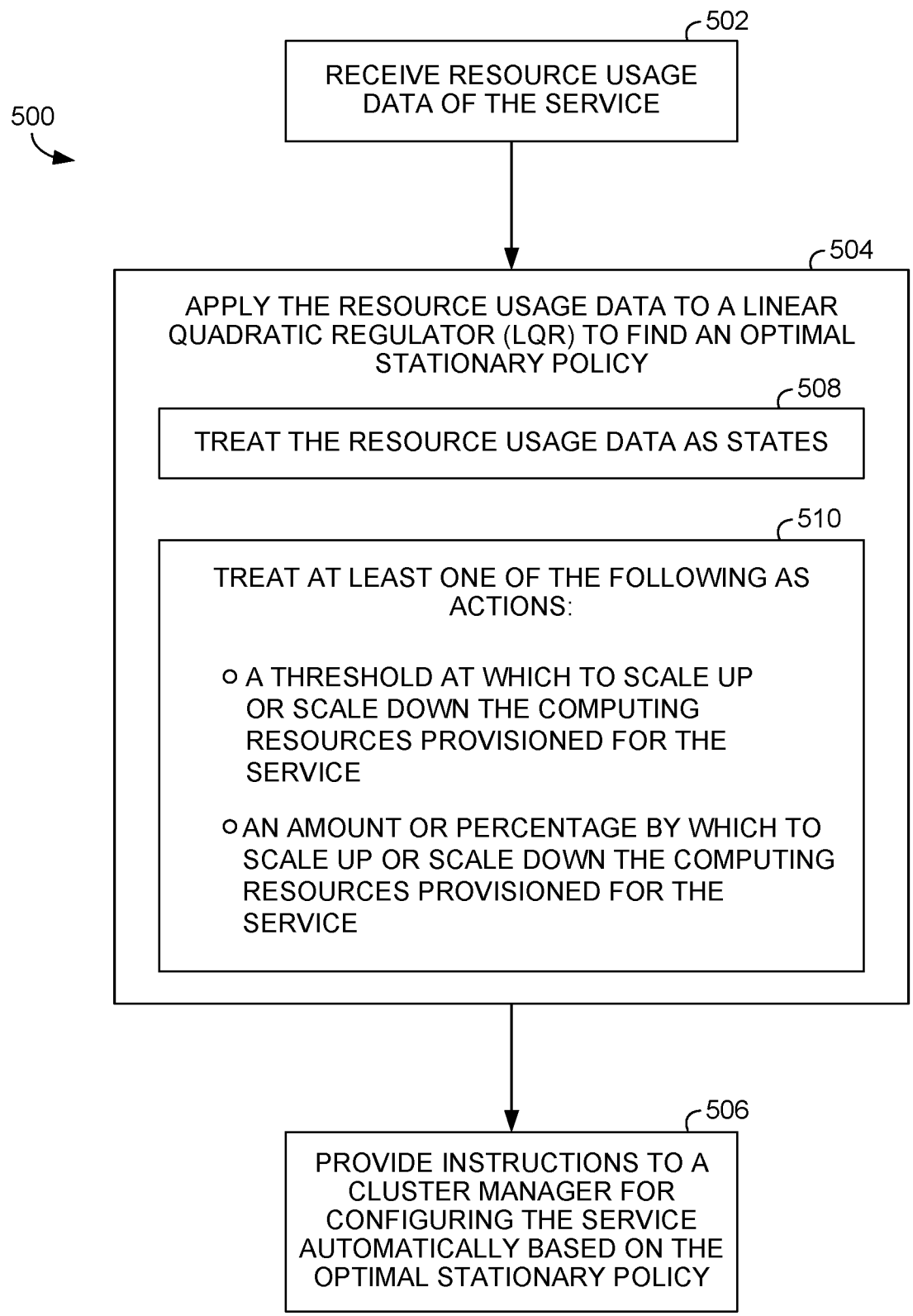
FIG. 5 is a flow diagram showing a second method for automatically adjusting computing resources provisioned for a service in accordance with some implementations of the present disclosure.

FIG. 5 depicts a method for automatically adjusting computer resources provisioned for a service utilizing model-based reinforcement learning (RL) for LQR. The method 500 depicted in FIG. 5 may be performed, for instance, by the system 400 illustrated in FIG. 4. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As depicted in FIG. 5, resource usage data of the service is received, as depicted in block 502, the resource usage data is applied to a linear quadratic regulator (LQR) to find an optimal stationary policy, as depicted in block 504, and instructions are provided for configuring the service automatically based on the optimal stationary policy, as depicted in block 506. The instructions provided from the LQR controller 420 to the cluster manager 430 may instruct the cluster manager to scale up or scale down resources provisioned for the service. Furthermore, when applying the resource usage data to the LQR, the resource usage data may be treated as states, as depicted in block 508, and, as depicted in block 510, at least one of the following may be treated as actions: (1) a threshold at which to scale up or scale down the computing resources provisioned for the service, and (2) an amount or percentage by which to scale up or scale down the computing resources provisioned for the service (by assigning more or less resources). In some embodiments, the optimal stationary policy is calculated using Riccati algorithm. Furthermore, in some embodiments, the LQR is regularized and/or is a trajectory-tracking LQR that uses sparsity and low-rank structure. In some embodiments, the LQR comprises a linear optimal policy and a quadratic optimal value function.

Resource usage data can be provided as usage percentage of resources (e.g., actual usage/assigned resources) and can include usage of CPUs, machines, memory, servers, and the like. State variables such as CPU usage, memory usage, and the like can be observed at any level of granularity, but in some embodiments are monitored in time intervals of only a few minutes (e.g., one minute, two minutes, three minutes, or the like). Rules for scaling up or down can also be adjusted based on monitoring the service (e.g., the job/application algorithm) to understand how it well scales. Specifically, such monitoring can determine performance benefits when additional resources are added. Such feedback data is then incorporated into decision processes or rules for scaling up or down.

As implemented in the method 500 described above, a standard LQR (provided in the equation below) may have a policy restricted to linear class (i.e., $u_t = K x_t$) and a regularizer added on the policy to induce the policy structure. This regularized LQR problem may be stated as follows:

$$\underset{K}{\text{minimize}} \quad \overbrace{E\left(\sum_{c=0}^{\infty} x_t^T Q_{x_t} + u_t^T R_{u_t}\right)}^{f(k)} + \lambda r(K)$$

$$\text{Subject to} \quad x_{t+1} = A_{x_t} + B_{u_t},$$

$$u_t = K_{x_t},$$

$$x_0 \sim \mathcal{D},$$

for a nonnegative parameter $\lambda \geq 0$. Here $f(K)$ Is the (averaged) cost-to-go under policy K, and r: $R^{n \times m} \to R$ is a nonnegative convex regularizer inducing the structure of policy K. Note that the current state may be represented as $x_t$ (e.g., current resource usage) and the current action may be represented as $u_t$ (e.g., threshold and scaling factor), while the next state is represented by $x_{t+1}$. Solving $u_t$ tells the system or cluster manager how to allocate resources.

The policy captured by the K matrix induces sparse, block sparse, or low-rank structures respectively. Specifically, different regularizers induce different types of structures on the policy K. Some that may be used for the method herein include lasso $r(K)=\|K\|_1=\Sigma_{i,j}|K_{i,j}|$, group lasso $r(K)=\|K\|_{G,2}=\Sigma_{g\in G}\|K_g\|_2$ where $K_g \in R_{|g|}$ is the vector consisting of an index set g, and nuclear-norm $r(K)=\|K\|_*=\Sigma_i \sigma_i(K)$ where $\sigma_i(K)$ is the ith largest singular value of K. These induce sparse, block sparse, and low-rank structure respectively. For a given reference policy $K^{ref} \in R^{n \times m}$, we can similarly consider $\|K-K^{ref}\|_1$, $\|K-K^{ref}\|_{G,2}$, and $\|K-K^{ref}\|_*$, penalizing the proximity (in different metric) to the reference policy $K^{ref}$. Regularizing the rank of the K makes storing K and computing K much more efficient. Note that for various regularizers described herein, and each can have the closed-form solution for its proximal operator. Here only a few representative proximal operator examples are provided, but others may be used without departing from the scope of the technology described herein. These examples include the following:

---

1. Lasso. For $r(K) = \|K\|_1$,
   $(prox_{r,\lambda\eta}(K))_{i,j} = sign(K_{i,j})(|K_{i,j}| - \lambda\eta)_+$.
   And we denote $prox_{r,\lambda\eta}(K) := S_{\lambda\eta}(K)$ as a soft-thresholding operator.
2. Nuclear norm. For $r(K) = \|K\|_*$,
   $prox_{r,\lambda\eta}(K) = U diag(S_{\lambda\eta}(\sigma)) V^T$.
   where $K = U diag(\sigma) V^T$ is singular value decomposition with singular values $\sigma \in R^{min(n,m)}$.
3. Proximity to $K^{ref}$. For $r(K) = \|K - K^{ref}\|_F^2$
   $$prox_{r,\lambda\eta}(K) = \frac{2\lambda\eta K^{ref} + K}{2\lambda\eta + 1}.$$

---

Note that for a standard (unregularized) LQR, the objective function $f(K)$ is known to be not convex, quasiconvex, nor star-convex, but to be gradient dominant. Therefore, all the stationary points are optimal as long as $E[x_0 x_0^T]>0$. However, in regularized LQR, all the stationary points of the regularized LQR problem above may not be optimal under the existence of multiple stationary points.

The regularized LQR problem above may be simplified into:

minimize$F(K):=f(K)+\lambda r(K)$.

Here $f(K)=Tr(\Sigma_0 P)$ where $\Sigma_0=E[x_0 x_0^T]$ is the covariance matrix of initial state and P is the quadratic value matrix satisfying the following Lyapunov equation:

$(A+BK)^T P(A+BK)-P+Q+K^T RK=0$.

In this manner, a structured policy iteration (S-PI) can be used to evaluate the LQR under policy $K^i$ such as by solving Lyapunov equation or the like and then implementing policy improvement for LQR using a proximal gradient method or the like. Specifically, the S-PI above is an algorithm consisting of two parts: (1) policy evaluation and (2) policy improvement. In the policy evaluation part, Lyapunov equations can be solved to compute the quadratic value matrix P and covariance matrix $\Sigma$. In the policy improvement part, the policy is improved while encouraging some structure, via the proximal gradient method with proper choice of an initial stepsize and a backtracking linesearch strategy. This is an iterative process and stops when the policy does not change by an appreciable amount.

One example algorithm for S-PI that converges in a stationary point linearly is provided in the numbered equations below:

---

1: given initial stable policy $K^0$ And intital state covariance matrix $\Sigma_0 = E[x_0 x_0^T]$, linesearch factor $\beta < 1$.
2: repeat
3:     (1) Policy (and covariance) evaluation:
4:     compute $(P^i, \Sigma^i)$ Satisfying Lyapunov equations
    $(A + BK^i)^T P^i(A + BK^i) - P^i + Q + (K^i)^T RK^i =$
    $(A + BK^i)\Sigma^i(A + BK^i)^T - \Sigma^i + \Sigma_0 = 0$.
    return $(P^i, \Sigma^i)$
5:     (2) Policy improvement:
6:     initial stepsize $\eta_i = O(1/\lambda)$.
7:     compute gradient at K
    $\nabla_K f(K^i) = 2 ((R + B^T P^i B)K^i + B^T P^i A) \Sigma^i$
8:     repeat
9:         $\eta_i := \beta \eta_i$
10:         $K^{i+1} \leftarrow$ ProxGrad$(\nabla f(K^i), \eta_i, r, \lambda)$ (in Alg. 2).
11:     until linesearch (8) criterion is satisfied.
    return next iterate $K^{i+1}$.
12: until stopping criterion $\|K^{i+1} - K^i\| \leq \epsilon$ is satisfied.

---

In some embodiments, an initial stepsize $\eta=O(1/\lambda)$ is used, and generally scales well, alleviating iteration counts and leading to a faster algorithm in practice. However, other initial stepsizes not depending on the regularization parameter A can be used without departing from the scope of the technology described herein. Because proximal gradient step can be sensitive to stepsizes, leading to an unstable policy K with $\rho(A+BK) \geq 1$ or requiring a large number of iteration counts to converge, some embodiments may utilize linesearch over fixed stepsize.

One example algorithm for this proximal gradient (e.g., Subroutine: ProxGrad $(\nabla f(K), \eta, r, \lambda)$) is provided in the numbered equations below:

---

1: Input gradient oracle $\nabla f(K)$, stepsize $\eta$, and regularization r and its parameter $\lambda$
2: take gradient step
    $G \leftarrow K - \eta \nabla_K f(K)$
3: take proximal step $$K^+ \leftarrow prox_{r(\cdot),\lambda\eta}(G) := \underset{K}{argmin}\, r(K) + \frac{1}{2\lambda\eta}\|K - G\|_F^2$$

4: return $K^+$

---

In some embodiments, a backtracking linesearch is utilized for the equations described herein. Given $\eta_i$, $K^i$, $\nabla f(K^i)$, and the potential next iterate $K^{i+1}$, this checks if the following criterion (the stability and the decrease of the objective) is satisfied:

$$f(K^{i+1}) \leq f(K^i) - \eta_i Tr(\nabla f(K^i)^T G_{\eta_i}(K^i)) + \frac{\eta_i}{2}\|G_{\eta_i}(K^i)\|_F^2,$$

$$\rho(A + BK^{i+1}) < 1,$$

where $$G_{\eta_i}(K) = \frac{1}{\eta_i}(K - prox_{r,\lambda\eta_i}(K - \eta_i \nabla f(K)))$$

and $\rho(\cdot)$ is the spectral radius. Otherwise, it shrinks the stepsize $\eta_i$ by a factor of $\beta<1$ and checks it iteratively until the backtracking linesearch equation above is satisfied.

Furthermore, the equations described herein may start with a stable policy $K^0$, meaning $\rho(A+BK^0)<1$. For example, under standard assumptions on A, B, Q, R, Riccati recursion provides a stable policy, the solution of standard LQR in the equation above. Then, subsequently satisfying the linesearch criterion in the linesearch equation above, the rest of the policies $\{K^i\}$ are a stabilizing sequence.

This structured RL embodiment using LQR overcomes problems of the prior art by dynamically selecting optimal thresholds in real-time as a current state of the system is observed. By treating the thresholds (such as the scale-down/scale-up factor) as actions in the LQR method described herein, the method benefits from sparsity constraints imposed thereby. However, note that the LQR method described herein can be used without the use of an autoscaler without departing from the scope of the technology described herein. In addition to maintaining desired performance while reducing costs, this method may also improve performance in settings such as an abrupt change in state or a spike in traffic.

In some embodiments of this LQR method described above and depicted in FIG. 3, if a cost function and transition dynamic are unknown, such as in a model-free setting, policy may be directly learned from trajectory data without explicitly estimating the cost or transition model. Note that, in a model-free setting, model parameters A, B, Q and R cannot be directly accessed, which hinders the direct computation of P, $\Sigma$, and $\nabla f(K)$ accordingly. Instead, we adopt a smoothing procedure to estimate the gradient based on samples.

Model-free S-PI consists of two steps: (1) policy evaluation step and (2) policy improvement step. Specifically, the model-free S-PI may be explained via the following algorithm:

1: given initial stable policy $K^0$, number of trajectories $N_{traj}$, roll-out horizon H, smoothing parameter r, and (fixed) stepsize $\eta$.
2: repeat
3:    (1) (Perturbed) policy evaluation:
4:    for j = 1, ..., $N_{traj}$ do
5:       sample a perturbed policy $\hat{K}^i = K^i + U^j$ where and $U^j \sim \text{Uniform}(\mathbb{S}_r)$.
6:       roll out $\hat{K}^i$ from sampled initial state $x_0 \sim \mathcal{D}$, over the horizon H to estimate the cost-to-go $$\hat{f}^j = \sum_{t=0}^{H} g_t$$

where $g_t := g(x_t, \hat{K}^i x_t)$ is the stage cost incurred at time t.
7:    end for return cost-to-go and pertubation $\{\hat{f}^j, U^j\}_{j=1}^{N_{traj}}$ 8:    (2) Policy improvement:
9:    estimate the gradient $$\nabla \widehat{kf(K^i)} = \frac{1}{N_{traj}} \sum_{j=1}^{N_{traj}} \frac{d}{r^2} \hat{f}^j U^j$$

10:    $K^{i+1} \leftarrow \text{ProxGrad}(\nabla \widehat{kf(K^i)}, \eta, r, \lambda)$ (in Alg. 2). return next iterate $K^{i+1}$.
11: until stopping criterion $\|K^{i+1} - K^i\| \leq \epsilon$ satisfied.

In (perturbed) policy evaluation step, perturbation $U^j$ is uniformly drawn from the surface of the ball with radius r, $\mathbb{S}_r \subset R^{n \times m}$. These data are used to estimate the gradient via a smoothing procedure for the policy improvement step. With this approximate gradient, proximal gradient subroutine tries to decrease the objective while inducing the structure of policy. Comparing to the known-model S-PI described above, one important difference is its usage of a fixed stepsize $\eta$, rather than an adaptive stepsize from a backtracking linesearch that requires to access function value $f(K)=\text{Tr}(\Sigma_0 P)$ explicitly. For proper parameters (perturbation, horizon counts, trajectory counts), the gradient estimate from the smoothing procedure is close to actual gradient with high probability, and approximate proximal gradient still converges linearly with high probability. Thus smoothing procedures may be used to enable analysis of the convergence rate and parameter dependency.

General Computing Environment

Figure 6:
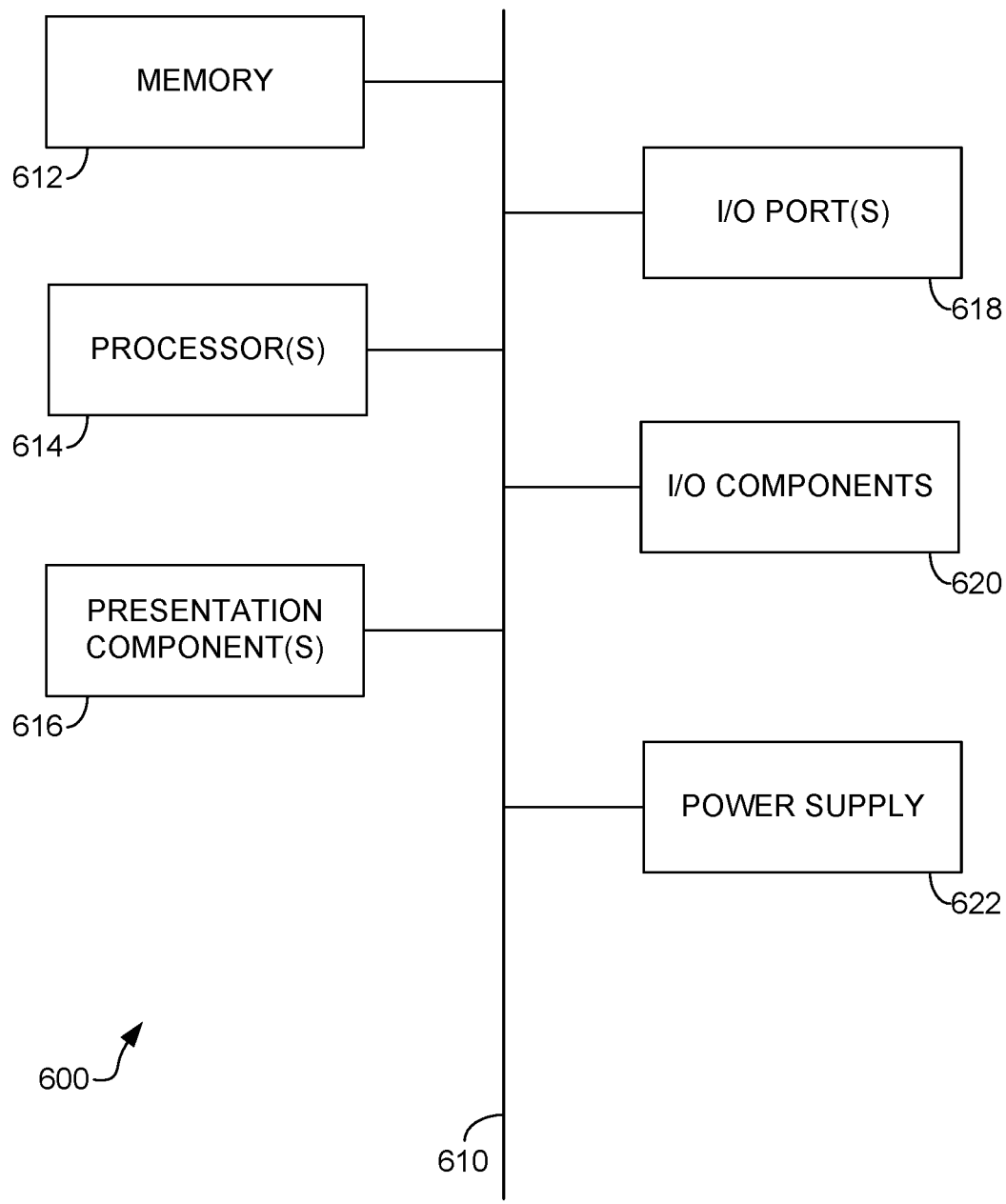
FIG. 6 is a block diagram of an exemplary computing environment suitable for use in implementations of the present disclosure

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 400. Computing device 600 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes bus 410 that directly or indirectly couples the following devices: memory 412, one or more processors 414, one or more presentation components 416, input/output (I/O) ports 418, input/output components 420, and illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion.

As described above, implementations of the present disclosure relate to a computer-implemented method for automatically adjusting computing resources provisioned for a service. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method for provisioning resources to a service, the method comprising:
   receiving historical resource usage data of the service;
   generating predictive resource usage for the service over a time interval by applying the historical resource usage data to a predictive model;
   determining, for each service configuration of a plurality of service configurations, scaling requirements that satisfy the predictive resource usage;
   determining, for each service configuration of the plurality of service configurations, resource wastage based on the predictive resource usage and the scaling requirements for each service configuration;
   generating, for each service configuration of the plurality of service configurations, a cost value based on the scaling requirements and the resource wastage for each service configuration; and
   configuring the service with one or more service configurations of the plurality of service configurations automatically selected based on the cost value for each service configuration.

2. The computer-implemented method of claim 1, wherein the predictive model is an autoregressive integrated moving average (ARIMA) model.

3. The computer-implemented method of claim 1, wherein configuring the service comprises outputting, to a cluster manager for execution, the one or more service configurations of the plurality of service configurations automatically selected.

4. The computer-implemented method of claim 3, further comprising the cluster manager scaling resources provisioned for the service at least one of up and down in accordance with the one or more service configurations of the plurality of service configurations automatically selected.

5. The computer-implemented method of claim 1, wherein the cost value is generated using a cost function that outputs an overall cost associated with a configuration tuple for each service configuration of the plurality of service configurations the configuration tuple for each service configuration comprising one or more selected from the following: a threshold for when to scale up, a threshold for when to scale down, an amount of resources to add when scaling up, and an amount of resources to remove when scaling down.

6. The computer-implemented method of claim 1, wherein the predictive model is a predictive time series based model that generates the predictive resource usage for one time interval in advance, wherein the time interval is based on specifications of the service.

7. The computer-implemented method of claim 1, wherein the scaling requirements include a number of times during the time interval the service would at least one of scale up and scale down a quantity of at least one provisioned resource selected from the following: CPUs, containers, memory provisioned for the service, and disk size of containers provisioned for the service.

8. One or more non-transitory computer storage media storing computer-useable instructions that, when used by one or more computing devices, cause the one or more computing devices to perform operations comprising:

generating predictive resource usage for a service over a time interval by applying historical resource usage data to a predictive model;

determining, for each service configuration of a plurality of service configurations, scaling requirements that satisfy the predictive resource usage, wherein the scaling requirements for each service configuration include a number of times during the time interval the service would at least one of scale up and scale down a quantity of provisioned resources;

determining, for each service configuration of the plurality of service configurations, resource wastage based on the predictive resource usage and the scaling requirements for each service configuration;

generating, for each service configuration of the plurality of service configurations, a cost value based on the scaling requirements and resource wastage associated with each service configuration; and configuring the service with one or more service configurations of the plurality of configurations automatically selected based on the cost value for each service configuration.

9. The non-transitory computer storage media of claim 8, wherein the predictive model is an autoregressive integrated moving average (ARIMA) model.

10. The non-transitory computer storage media of claim 8, wherein configuring the service comprises outputting, to a cluster manager for execution, the one or more service configurations of the plurality of service configurations automatically selected.

11. The non-transitory computer storage media of claim 10, wherein configuring the service further comprises scaling resources provisioned for the service at least one of up and down in accordance with the automatically selected one or more service configurations of the plurality of service configurations.

12. The non-transitory computer storage media of claim 8, wherein the cost value is generated using a cost function that outputs an overall cost associated with a configuration tuple for each service configuration of the plurality of service configurations, the configuration tuple for each service configuration comprising one or more selected from the following: a threshold for when to scale up, a threshold for when to scale down, an amount of resources to add when scaling up, and an amount of resources to remove when scaling down.

13. The non-transitory computer storage media of claim 8, wherein the predictive model generates the predictive resource usage for one time interval in advance, wherein the time interval is adjustable based on specifications of the service.

14. The non-transitory computer storage media of claim 8, wherein configuring the service includes providing instructions for at least one of increasing and decreasing the provisioned resources, the provisioned resources including at least one of the following: a quantity of at least one of CPUs, containers, and memory or disk size provisioned for the service.

15. A system comprising:
one or more processors; and
one or more non-transitory computer storage media storing computer- useable instructions that, when used by the one or more processors, cause the one or more processors to perform operations comprising:

generating predictive resource usage for a service over a time interval by applying historical resource usage data to a predictive model;

determining, for each service configuration of a plurality of service configurations, scaling requirements that satisfy the predictive resource usage, wherein the scaling requirements for each service configuration include a number of times during the time interval the service would at least one of scale up and scale down a quantity of provisioned resources;

determining, for each service configuration of the plurality of service configurations, resource wastage based on the predictive resource usage and the scaling requirements for each service configuration;

generating, for each service configuration of the plurality of service configurations, a cost value based on the scaling requirements and resource wastage associated with each service configuration; and configuring the service with one or more service configurations of the plurality of configurations automatically selected based on the cost value for each service configuration.

16. The system of claim 15, wherein configuring the service comprises outputting, to a cluster manager for execution, the one or more service configurations of the plurality of service configurations automatically selected.

17. The system of claim 16, wherein configuring the service further comprises scaling resources provisioned for the service at least one of up and down in accordance with the automatically selected one or more service configurations of the plurality of service configurations.

18. The system of claim 15, wherein each service configuration of the plurality of service configurations comprises one or more selected from the following: a threshold for when to scale up, a threshold for when to scale down, an amount of resources to add when scaling up, and an amount of resources to remove when scaling down.

19. The system of claim 15, wherein the predictive model generates the predictive resource usage for one time interval in advance, wherein the time interval is adjustable based on specifications of the service.

20. The system of claim 15, wherein configuring the service includes providing instructions for at least one of increasing and decreasing the provisioned resources, the provisioned resources including at least one of the following: a quantity of at least one of CPUs, containers, and memory or disk size provisioned for the service.

* * * * *

UNITED STATES PATENT AND TRADEMARK OFFICE
CERTIFICATE OF CORRECTION

| | |
|---|---|
| PATENT NO. | : 11,487,579 B2 |
| APPLICATION NO. | : 16/867104 |
| DATED | : November 1, 2022 |
| INVENTOR(S) | : Kanak V Mahadik et al. |

It is certified that error appears in the above-identified patent and that said Letters Patent is hereby corrected as shown below:

In the Claims

Claim 5, Column 16, Line 46:
In the line reading "configurations the configuration tuple for each service con-" should read --configurations, the configuration tuple for each service con- --.

Claim 15, Column 18, Line 7:
In the reading "ing computer- useable instructions that, when used by" should read --ing computer-useable instructions that, when used by--.

Signed and Sealed this
Seventh Day of March, 2023

*Katherine Kelly Vidal*

Katherine Kelly Vidal
*Director of the United States Patent and Trademark Office*